UNITED STATES PATENT OFFICE.

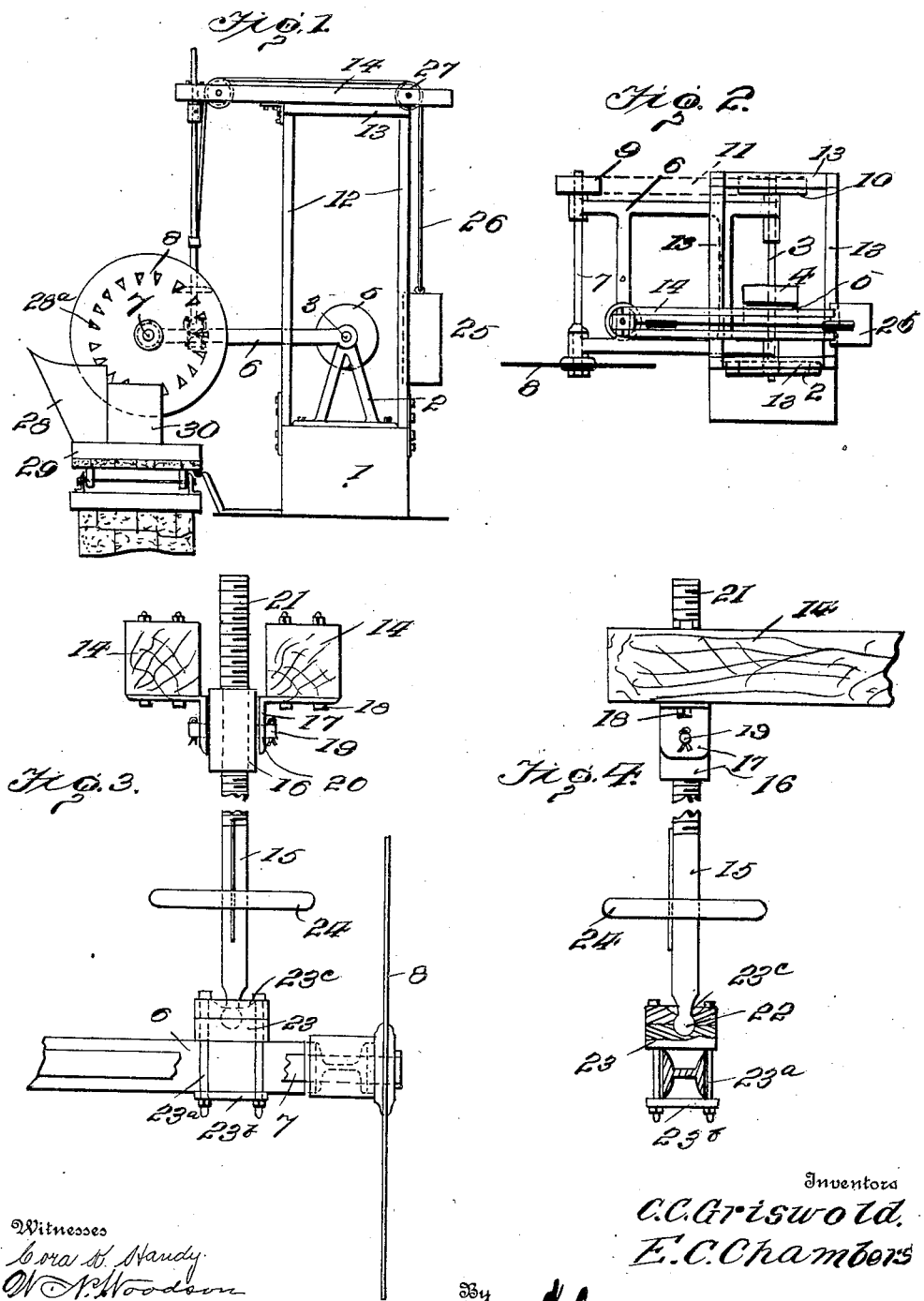

CHARLES C. GRISWOLD AND EDWARD C. CHAMBERS, OF CHICAGO, ILLINOIS.

CIRCULAR STONE-SAW.

No. 925,333.      Specification of Letters Patent.      Patented June 15, 1909.

Application filed September 30, 1908. Serial No. 455,401.

*To all whom it may concern:*

Be it known that we, CHARLES C. GRISWOLD and EDWARD C. CHAMBERS, citizens of the United State, residing at Chicago, in the county of Cook and State of Illinois, have invented certain new and useful Improvements in Circular Stone-Saws, of which the following is a specification.

The object of our invention is to provide a device for cutting stone and relates more particularly to means for feeding the stone and retaining the blade or cutter disk against vertical vibration while in operation. In practice it has been found that saws of this character are insufficient of their own weight to prevent a jumping or vibratory movement of the blade revolving at high speed, when hard spots are encountered, and our invention is particularly adapted to eliminate this objectionable feature.

The invention further consists of a novel construction and arrangement of the several parts designed to retain the blade in contact with the stone and promote the cutting efficiency without unnecessary addition to the weight or bulk of the device.

For a full understanding of the invention and the merits thereof and to acquire a knowledge of the details of construction and the means for effecting the result reference is to be had to the following description and accompanying drawings, in which:

Figure 1 is a side elevation. Fig. 2 is a top plan view. Fig. 3 is a front view, and Fig. 4 is a detailed illustration of the feed attachment.

Corresponding and like parts are referred to in the following description and indicated in all the views of the drawings by the same reference characters.

The numeral 1 designates the base or superstructure to which the pedestal bearings 2 are secured, and 3 designates a counter shaft journaled in said bearings and carrying fast and loose pulleys 4 and 5 respectively. The said pulleys are adapted to be driven by a belt (not shown) from any convenient source of power, and are secured to said shaft as indicated by the term applied and for purposes understood. The numeral 6 designates the frame carrying the saw arbor 7 and saw blade 8 at one end, and supported upon the counter shaft 3 at its opposite end to form a hinge, by means of which the end of the frame carrying the saw arbor may be raised or lowered to bring the blade into or out of contact with the stone. A pulley 9 is secured to the saw arbor 7, and the numeral 10 designates a similar pulley secured to the counter shaft adapted to be connected to the pulley 9 by a belt 11.

The numeral 12 designates standards or uprights secured to the base 1, and connected at their upper ends by cross beams 13 to form a frame to which the overhanging beams or supports 14 are secured. The said beams 14 are parallel to each other and overhang the frame 6 and support a screw shaft 15 operating in a swivel nut 16 secured between the ends of the beams by means of brackets 17 secured to said beams as by bolts 18. Oppositely disposed projections or pins 19 on the nut 16 are arranged to extend through openings 20 in the wall plates of the brackets 17, and pivotally retain said nut in its proper relative position between the beams 14 to coöperate with the screw shaft 15. The end of the shaft operating within the nut is threaded as shown at 21, and is provided at the opposite end with a ball 22 adapted to fit within a socket 23 on the arbor frame 6, and a hand wheel 24 conveniently located and secured to said shaft is designed to furnish means for the manipulation of the shaft to raise or lower the end of said frame 6 carrying the saw arbor 7 and to hold said arbor and frame from vibratory movement. The said socket consists of a sectional block secured to the frame beam as by bolts $23^a$ on either side of said beam and secured to a plate $23^b$ on the under side thereof. The sections are provided with oppositely formed recesses registering with each other to form an opening within which the ball 22 is permitted to move, and the upper section of said socket may be recessed as shown at $23^c$, whereby movement of the enlarged portion of the shaft 15 adjacent to the ball 22 will not be retarded.

The numeral 25 designates a counter balance weight secured to the shaft 15 in any suitable manner as by a rope 26 attached to said shaft and extending over rollers 27 supported by the beams 14 to the rear of the frame where said weight is preferably located. The saw blade or cutter disk intersecting the hopper 28 is provided with kerfs or recesses $28^a$ adapted to carry sand and water from said hopper to the surface of the stone, and the numeral 29 designates a car upon which the stone 30 may be supported and illustrates a convenient method of transportation.

With the arrangement of the several parts as shown the saw blade 8 is adapted to intersect the hopper 28 and revolve at high speed, motion being transmitted from the counter shaft 3 by the belt 11 passing over the pulleys 9 and 10. When the stone is placed in the desired position, the frame 6 carrying the saw arbor 7 is lowered to bring the blade 8 in contact with the stone, and accomplished by the manipulation of the hand wheel 24 connected to said frame at one end and operating at its opposite end in the swivel nut 16. The steady unyielding pressure maintained by turning the hand wheel to feed the saw blade into the stone will result in the saw blade and frame being held firmly in contact with the stone at all times, and the elimination of the jumping or vibratory movement consequent upon the saw blade coming in contact with the harder portions of the stone under operation.

The advantage of the ball and socket connection between the frame 6 and the screw shaft 16 in conjunction with the swivel nut connection at the opposite end of said shaft, is especially advantageous in that the pressure exerted upon the frame will invariably be directed in line with the contact or cutting point of the saw blade, and transversely to the line of the frame 6 regardless of its angle. When the hand wheel is turned to release the pressure upon the frame 6 the counter balance weight 25 will lift the frame and saw blade clear of the stone, and permit of the withdrawal of the stone as will be understood.

It will be noted that the arrangement of the pulleys 9 and 10 permits of the saw arbor 7 and frame 6 being raised or lowered without affecting the tension of the belt 11.

Having thus described the invention, what is claimed as new is:

1. In mechanism of the class described, the combination with a pivoted frame, a saw arbor and blade rotatably mounted on said frame, of a driving wheel for the saw arbor mounted on the pivotal axis of the frame, a fixed overhead frame, an adjusting screw shaft swiveled at one end to the pivoted frame, a nut pivoted upon the overhead frame through which the shaft passes, and means on the shaft for rotating the same to feed the saw downwardly.

2. A circular stone saw comprising a swinging frame, a saw arbor and blade mounted upon said frame, a socket secured to said frame and adapted to receive a ball, a screw shaft provided with a ball formation at one end adapted to fit within said socket, a swivel nut supported above said frame arranged to engage the threaded portion of said shaft, and a hand wheel secured to said shaft.

3. In mechanism of the class described, a pivoted frame, a saw arbor and blade rotatably mounted in the frame, a driving wheel for the saw arbor mounted upon the pivotal axis of the frame, uprights extending to a point vertically above the pivoted frame, a fixed frame supported on said uprights and overhanging the saw, a nut pivotally supported on the ends of the fixed frame, an adjusting screw shaft having a swiveled engagement at its lower end with said pivoted frame and passing at its other end through said nut, a wheel mounted on the screw shaft whereby it may be turned to adjust the saw and arbor, a counterweight, and a flexible connection passing over the overhead frame and connected at one end to the counterweight and at the other to the arbor supporting pivoted frame.

In testimony whereof we affix our signatures in presence of two witnesses.

CHARLES C. GRISWOLD. [L. S.]
    EDWARD C. CHAMBERS. [L. S.]

Witnesses:
 MARK A. FOOTE,
 MARK P. GRINER.